US011676001B2

(12) United States Patent
Jiao et al.

(10) Patent No.: US 11,676,001 B2
(45) Date of Patent: Jun. 13, 2023

(54) LEARNING GRAPH REPRESENTATIONS USING HIERARCHICAL TRANSFORMERS FOR CONTENT RECOMMENDATION

(71) Applicant: Microsoft Technology Licensing, LLC, Redmond, WA (US)

(72) Inventors: Jian Jiao, Bellevue, WA (US); Xiaodong Liu, Redmond, WA (US); Ruofei Zhang, Redmond, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 17/093,426

(22) Filed: Nov. 9, 2020

(65) Prior Publication Data

US 2022/0067030 A1    Mar. 3, 2022

Related U.S. Application Data

(60) Provisional application No. 63/072,770, filed on Aug. 31, 2020.

(51) Int. Cl.
*G06N 3/045*    (2023.01)
(52) U.S. Cl.
CPC .................... *G06N 3/045* (2023.01)
(58) Field of Classification Search
None
See application file for complete search history.

(56) References Cited

U.S. PATENT DOCUMENTS

| | | | | |
|---|---|---|---|---|
| 10,430,712 B1* | 10/2019 | Reed | ...................... | G06N 5/046 |
| 2019/0122111 A1* | 4/2019 | Min | ...................... | G06N 3/0427 |
| 2020/0342523 A1* | 10/2020 | Shah | ................... | G06F 16/9566 |
| 2021/0149993 A1* | 5/2021 | Torres | ................... | G06V 10/40 |
| 2021/0216881 A1* | 7/2021 | McCarthy | ............... | G06N 5/02 |
| 2021/0357378 A1* | 11/2021 | Urdiales | ............. | G06F 16/2237 |
| 2021/0365635 A1* | 11/2021 | Olabiyi | ................. | G06F 40/284 |
| 2021/0383228 A1* | 12/2021 | Velickovic | .......... | G06F 16/9024 |

OTHER PUBLICATIONS

Bansal, et al., "A2N: Attending to neighbors for knowledge graph inference", In Proceedings of the 57th Annual Meeting of the Association for Computational Linguistics, Jul. 28, 2019, pp. 4387-4392.

(Continued)

*Primary Examiner* — Scott A. Waldron

(57) ABSTRACT

Knowledge graphs can greatly improve the quality of content recommendation systems. There is a broad variety of knowledge graphs in the domain including clicked user-ad graphs, clicked query-ad graphs, keyword-display URL graphs etc. A hierarchical Transformer model learns entity embeddings in knowledge graphs. The model consists of two different Transformer blocks where the bottom block generates relation-dependent embeddings for the source entity and its neighbors, and the top block aggregates the outputs from the bottom block to produce the target entity embedding. To balance the information from contextual entities and the source entity itself, a masked entity model (MEM) task is combined with a link prediction task in model training.

20 Claims, 10 Drawing Sheets

(56) References Cited

OTHER PUBLICATIONS

Bauer, et al., "Commonsense for generative multi-hop question answering tasks", In Proceedings of the conference an Empirical Methods in Natural Language Processing, Oct. 31, 2018, pp. 4220-4230.
Bollacker, et al., "Freebase: a collaboratively created graph database for structuring human knowledge", In Proceedings of the ACM SIGMOD international conference on Management of data, Jun. 9, 2008, pp. 1247-1249.
Bordes, et al., "Translating Embeddings for Modeling Multi-Relational Data", In Proceedings of the 26th International Conference on Neural Information Processing Systems, vol. 2, Dec. 5, 2013, 99– 1-9.
Chami, et al., "Low-dimensional hyperbolic knowledge graph embeddings", In Proceedings of the 58th Annual Meeting of the Association for Computational Linguistics, Jul. 5, 2020, pp. 6901-6914.
Dettmers, et al., "Convolutional 2d knowledge graph embeddings", In Thirty-Second AAAI Conference on Artificial Intelligence, Feb. 7, 2020, pp. 1811-1818.
Devlin, et al., "BERT: Pre-training of Deep Bidirectional Transformers for Language Understanding", In Proceedings of the Conference of the North American Chapter of the Association for Computational Linguistics: Human language Technologies (NAACL 2019), Jun. 2, 2019, pp. 4171-4186.
Ebisu, et al., "Toruse: Knowledge graph embedding on a lie group", In Thirty-Second AAAI Conference on Artificial Intelligence, Feb. 7, 2018, pp. 1819-1826.
Hayashi, et al., "Latent relation language models", In Proceedings of the Thirty-Fourth AAAI Conference on Artificial Intelligence, Feb. 7, 2020, 14 Pages.
Ji, et al., "Knowledge graph embedding via dynamic mapping matrix", In Proceedings of the 53rd Annual Meeting of the Association for Computational Linguistics, Jul. 26, 2015, pp. 687-696.
Jiang, et al., "How can we know what language models know?", In Journal of Transactions of the Association for Computational Linguistics, vol. 8, 2020, 12 Pages.
Kingma, et al., "Adam: A Method for Stochastic Optimization", In Repository of arXiv:1412.6980, Dec. 22, 2014, 9 Pages.
Lin, et al., "Learning entity and relation embeddings for knowledge graph completion", In Twenty-ninth AAAI conference on artificial intelligence, Jan. 2015, pp. 2181-2187.
Logan, et al., "Barack's Wife Hillary: Using Knowledge Graphs for Fact-Aware Language Modeling", In journal of arXiv:1906.07241v2, Jun. 20, 2019, 10 Pages.
Manninga, et al., "Emergent linguistic structure in artificial neural networks trained by self-supervision", In Proceedings of the National Academy of Sciences, Jun. 3, 2020, pp. 1-9.
Miller, Georgea. , "WordNet: A Lexical Database for English", In journal of Communications of the ACM, vol. 38, Issue 11, Nov. 1, 1995, pp. 39-41.
Zhang, et al., "Quaternion knowledge graph embeddings", In Advances in Neural Information Processing Systems, Dec. 8, 2019, pp. 1-11.
Nathani, et al., "Learning attention based embeddings for relation prediction in knowledge graphs", In Proceedings of the 57th Annual Meeting of the Association for Computational Linguistics, Jul. 28, 2019, 10 Pages.
Zhang, et al., "ERNIE: Enhanced Language Representation with Informative Entities", In Repository of arXiv:1905.07129, Jun. 4, 2019, 11 Pages.
Nguyen, et al., "A capsule network-based embedding model for knowledge graph completion and search personalization". In Proceedings of the North American Chapter of the Association for Computational Linguistics Human Language Technologies, vol. 1 (Long and Short Papers), Jun. 2, 2019, pp. 2180-2189.
Nickel, et al., "A three-way model for collective learning on multi-relational data", In Proceedings of the 28th International Conference on International Conference on Machine Learning, Jun. 30, 2011, 24 Pages.
Parmar, et al., "Image Transformer", In Repository of arXiv:1802.05751v3, Jun. 15, 2018, 10 Pages.
Paszke, et al., "Pytorch: An imperative style, high-performance deep learning library", In Advances in Neural Information Processing Systems, 2019, pp. 1-12.
Riedel, et al., "Relation Extraction with Matrix Factorization and Universal Schemas", In Proceedings of the 2013 Conference of the North American Chapter of the Association for Computational Linguistics: Human Language Technologies, Jun. 9, 2013, pp. 74-84.
Rufhinelli, et al., "You CAN Teach an Old Dog New Tricks! On Training Knowledge Graph Embeddings", In International Conference on Learning Representations, Apr. 26, 2020, pp. 1-20.
Schlichtkrull, et al., "Modeling relational data with graph convolutional networks", In European Semantic Web Conference, Jun. 3, 2018, 10 Pages.
Sun, et al., "A re-evaluation of knowledge graph completion methods", In Proceedings of the 58th Annual Meeting of the Association for Computational Linguistics, Jul. 5, 2020, pp. 5516-5522.
Sun, et al., "Rotate: Knowledge graph embedding by relational rotation in complex space", In International Conference an Learning Representations, May 2019, pp. 1-18.
Tang, et al., "Orthogonal relation transforms with graph context modeling for knowledge graph embedding", In Proceedings of the 58th Annual Meeting of the Association for Computational Linguistics,, Jul. 5, 2020, pp. 2713-2722.
Teru, et al., "Inductive relation prediction by subgraph reasoning", In Proceedings of the 37th International Conference on Machine Learning, Jul. 13, 2020, 13 Pages.
Toutanova, et al., "Observed versus latent features for knowledge base and text inference", In Proceedings of the 3rd Workshop on Continuous Vector Space Models and their Compositionality, Jul. 26, 2015, pp. 57-66.
Trouillon, et al., "Complex embeddings for simple link prediction", In Proceedings of International Conference on Machine Learning, Jun. 2016, 10 Pages.
Vashishth, et al., "Composition-based multi-relational graph convolutional networks", In International Conference on Learning Representations, Apr. 26, 2020, pp. 1-16.
Vaswani, et al., "Attention Is All You Need", In Proceedings of the 31st Conference on Neural Information Processing Systems, Jun. 1, 2017, 11 Pages.
Velickovic, et al., "Graph Attention Networks", In Proceedings of 6th International Conference on Learning Representations, Apr. 30, 2018, 12 Pages.
Verga, et al., "Facts as experts: Adaptable and interpretable neural memory over symbolic knowledge", In Repository of arXiv:2007.00849v1, Jul. 2, 2020, 12 Pages.
Wang, et al., "Knowledge graph embedding by translating on hyperplanes", In Proceedings of the Twenty-Eighth AAAI Conference on Artificial Intelligence, Jul. 2014, pp. 1112-1119.
Xiong, et al., "DeepPath: A reinforcement learning method for knowledge graph reasoning", In Proceedings of the Conference on Empirical Methods in Natural Language Processing, Sep. 7, 2017, pp. 564-573.
Yang, et al., "Embedding entities and relations for learning and inference in knowledge bases.", In Repository of, Dec. 20, 2014, pp. 1-13.
Chen, et al., "HittER: Hierarchical Transformers for Knowledge Graph Embeddings", In Repository of arXiv:2008.12813v1, Aug. 28, 2020, 12 Pages.
Huang, et al., "Incorporating Entity Type Information into Knowledge Representation Learning", In Proceedings of IEEE Fifth International Conference on Data Science in Cyberspace, Jul. 27, 2020, pp. 98-104.
Liu, et al., "Aggregating Neighborhood Information for Negative Sampling for Knowledge Graph Embedding", In Journal of Neural Computing and Applications, May 8, 2020, pp. 17637-17653.
"International Search Report and Written Opinion Issued in PCT Application No. PCT/US21/035058", dated Jan. 4, 2022, 11 Pages.

\* cited by examiner

LEARNING GRAPH REPRESENTATIONS USING HIERARCHICAL TRANSFORMERS FOR CONTENT RECOMMENDATION

CROSS-REFERENCE TO RELATED APPLICATIONS

This application claims priority to and the benefit of U.S. Provisional Patent Application No. 63/072,770, filed on Aug. 31, 2020, the disclosure of which is hereby incorporated herein by reference in its entirety.

BACKGROUND

Knowledge graphs are a major form of knowledge base where knowledge is stored as graph-structured data. Due to its broad applications in various intelligent systems including natural language understanding and reasoning, learning representations has become a priority. To learn good representations of knowledge graphs, many researchers adopt the idea of mapping the entities and relations in the knowledge graph to points in a vector space. These knowledge graph embedding methods usually leverage geometric properties in the vector space, such as translation, bilinear transformation, or rotation. More recently, deep convolutional neural networks are also applied to this task. However, by learning a single link at a time, these approaches exploit only local connectivity patterns in the knowledge graph but ignore the vast structural formation in the graph context.

A relational graph convolutional neural network may improve models by adding contextual information. But learning knowledge graph embeddings in a relational context remains challenging.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In accordance with examples of the present disclosure, methods and systems are provided that are directed to learning graph entity representations (e.g., embeddings) using hierarchical Transformers for content recommendation.

In an example implementation, a hierarchical Transformer model learns entity embeddings in knowledge graphs. Knowledge graphs can greatly improve the quality of content recommendation systems such search queries and online advertising. There is a broad variety of knowledge graphs in the domain including clicked user-ad graphs, clicked query-ad graphs, keyword-display URL graphs etc. The model includes two different Transformer blocks where the bottom block generates relation-dependent embeddings for the source entity and its neighbors, and the top block aggregates the outputs from the bottom block to produce the target entity embedding. To balance the information from contextual entities and the source entity itself, a masked entity model (MEM) task is combined with a link prediction task in model training. The model provides for improved mean reciprocal rank (MRR) as compared to conventional models, where MRR is a statistic measure for evaluating the efficiency and accuracy of query results. For example, the model was evaluated using link prediction task and achieved new state-of-the-art results on sampled datasets from two well-known public knowledge graphs: Freebace (FB15K-237) and WordNet (WN18RR), which demonstrated the model's capacity on learning entity representations, as described in more detail in Reference 1 below.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

REFERENCES

The following publications are incorporated by reference in their entirety:
1. Sanxing Chen and Xiaodong Liu and Jianfeng Gao and Jian Jiao and Ruofei Zhang and Yangfeng Ji (Aug. 28, 2020). "HittER: Hierarchical Transformers for Knowledge Graph Embeddings". arXiv:2008.12813
2. Polosukhin, Illia; Kaiser, Lukasz; Gomez, Aidan N.; Jones, Llion; Uszkoreit, Jakob; Parmar, Niki; Shazeer, Noam; Vaswani, Ashish (Jun. 12, 2017). "Attention Is All You Need". arXiv:1706.03762
3. Jacob Devlin, Ming-Wei Chang, Kenton Lee, and Kristina Toutanova. 2019. BERT: Pre-training of deep bidirectional transformers for language understanding. In Proceedings of the 2019 Conference of the North American Chapter of the Association for Computational Linguistics: Human Language Technologies, Volume 1 (Long and Short Papers), pages 4171-4186, Minneapolis, Minn. Association for Computational Linguistics

BRIEF DESCRIPTION OF THE DRAWINGS

Non-limiting and non-exhaustive examples are described with reference to the following Figures.

DETAILED DESCRIPTION

Figure 1:
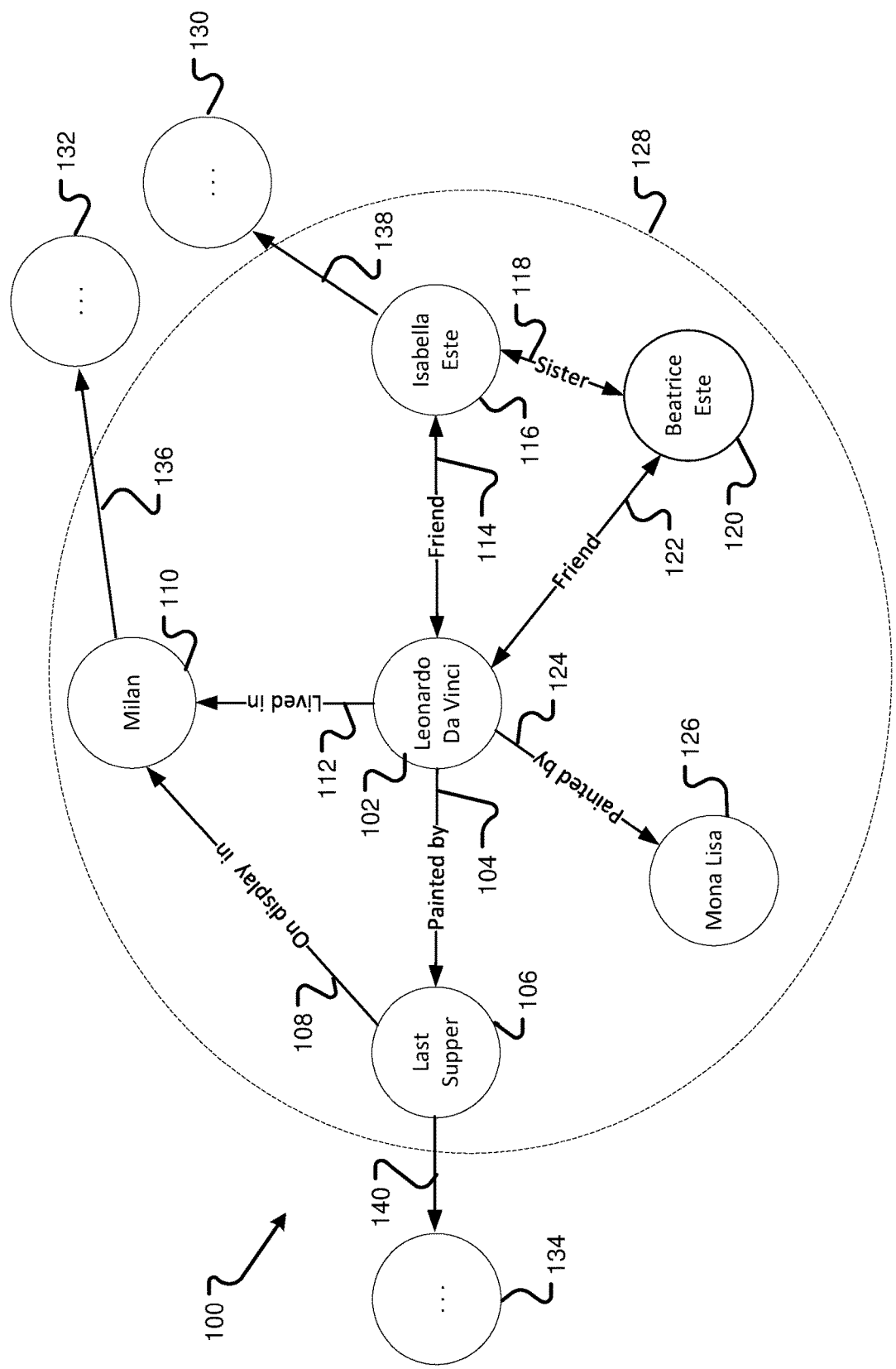
FIG. 1 details of a knowledge graph in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Neural networks usually process language by generating fixed- or variable-length vector-space representations of inputs. After starting with representations of individual words or even pieces of words, they aggregate information from surrounding words to determine the meaning of a given bit of language in context. Recurrent neural networks (RNNs) have in recent years become the typical network architecture for translation and processing language sequentially in a left-to-right or right-to-left fashion. Reading one word at a time, this forces RNNs to perform multiple steps to make decisions that depend on words far away from each other. The more such steps/decisions required, the harder it is for a recurrent network to learn how to make those decisions. Moreover, the sequential nature of RNNs also makes it more difficult to fully take advantage of modern fast computing devices such as TPUs and GPUs, which excel at parallel and not sequential processing. Convolutional neural networks (CNNs) are much less sequential than RNNs, but in CNN architectures, the number of steps required to combine information from distant parts of the input still grows with increasing distance.

In contrast, a Transformer is a neural network that performs only a small, constant number of steps (e.g., chosen empirically). In each step, it applies a self-attention mechanism which directly models relationships between all words in a sentence, regardless of their respective position. In the example "I arrived at the bank after crossing the river", to determine that the word "bank" refers to the shore of a river and not a financial institution, the Transformer can learn to immediately attend to the word "river" and make this decision in a single step. More specifically, to compute the next representation for a given word—"bank" for example—the Transformer compares it to every other word in the sentence. The result of these comparisons is an attention score for every other word in the sentence. These attention scores determine how much each of the other words should contribute to the next representation of "bank". In the example, disambiguating "river" could receive a high attention score when computing a new representation for "bank". The attention scores are then used as weights for a weighted average of all words' representations, which is fed into a fully-connected network to generate a new representation for "bank", reflecting that the sentence is talking about a river bank.

Neural networks as described herein contain an encoder reading the input sentence and generating a representation of it. A decoder then generates the output sentence word by word while consulting the representation generated by the encoder. The Transformer starts by generating initial representations, or embeddings, for each word. Then, using self-attention, it aggregates information from all of the other words, generating a new representation per word informed by the entire context. This step is then repeated multiple times in parallel for all words, successively generating new representations, or embeddings. The decoder operates similarly, but generates one word at a time, from left to right. It attends not only to the other previously generated words, but also to the final representations generated by the encoder.

Beyond computational performance and higher accuracy, another aspect of the Transformer is that it allows for visualization of what other parts of a sentence the network attends to when processing or translating a given word, thus gaining insights into how information travels through the knowledge base.

Knowledge Graphs (KGs) are a way of structuring information in graph form, by representing entities (e.g., people, places, objects) as nodes, and relationships between entities (e.g., being married to, being located in) as edges. Facts are typically represented as "SPO" triplets: (Subject, Predicate, Object) or (s, p, o). Two nodes connected by a relationship form a fact. For instance, (Mona Lisa, painted by, Da Vinci) is a triplet. Link prediction is among the most common tasks in KG analysis. Link prediction not only serves as a proxy to measure the ability of a model to generalize relational knowledge stored in knowledge graphs to unseen facts, but also has an important application to knowledge graph completion. Knowledge Graph Embeddings (KGEs) are an effective means for KG analysis. The assumption is that there are global features which explain the existence of triplets in a KG and embedding models try to capture those features using (typically low dimensional) vectors known as embeddings. Therefore, a Knowledge Graph Embedding model assigns vectors to the symbolic entities and relations. To measure the degree of plausibility of correctness of a triplet (s, p, o), a scoring function is defined. The function takes the embedding vectors of the triplet and returns a value showing plausibility of correctness of the triplet. KGEs have a wide range of downstream applications such as recommender systems, question answering, sentiment analysis etc. Knowledge graphs are also used by search engines, knowledge-engines, question-answering services, and social networks.

In some aspects of the present disclosure, hierarchical Transformers are utilized to learn knowledge graph embeddings. An example hierarchical Transformer KGE model of the present disclosure comprises two different Transformer blocks, where the bottom block produces relation-dependent entity embeddings for a neighborhood around the source entity and itself, and the top block aggregates information. Additionally, in some aspects a masked entity model (MEM) objective is introduced to balance the contextual information and information from the source entity itself. The hierarchical Transformers KGE model of the present disclosure achieves new state-of-the-art results as to the accuracy of link prediction.

FIG. 1 depicts a portion of a knowledge graph (KG) 100 having nine nodes 102, 106, 110, 116, 120, 126, 130, 132, 134 connected by edges 104, 108, 112, 114, 118, 122, 124, 136, 138, 140 in accordance with aspects of the present disclosure. The nodes represent entities (e.g., people, places, things) and the edges represent relationships between the entities. For example, node 102 represents Leonardo DaVinci and node 106 represents the Last Supper, which was painted by DaVinci as shown by edge 104. The Last Supper painting is on display in Milan as shown by edge 108 connecting nodes 106 to node 110. Da Vinci lived in Milan as represented by node 102 connected to node 110 by edge 112. Da Vinci also painted the Mona Lisa as shown by node 102 connected to node 126 by edge 124. Da Vinci was friends with Isabella Este as shown by node 102 connected to node 116 by edge 114. Da Vinci was friends with Beatrice Este as shown by node 102 connected to node 120 by edge 122. Isabella Este was a sister of Beatrice Este as shown by node 116 connected to node 120 by edge 118. Each pair of nodes connected by an edge is considered a triplet or a fact comprising a subject, predicate (e.g., relationship), and object (s, p, o). For example, node 102, edge 124, node 126 is a triplet—the Mona Lisa (e.g., subject) was painted by (e.g., predicate) Da Vinci (e.g., object). The dashed circle 128 represents a "neighborhood" of nodes that may be used for context as described in more detail with regard to FIGS. 4-5. Although KG 100 shows only nine nodes in a single dimension it should be appreciated that knowledge graphs may have any number of nodes and dimensions, such as millions or more nodes and multiple dimensions. Knowledge graphs, such as KG 100, can greatly improve the quality of content recommendation systems such search queries and online advertising searches.

Figure 2:
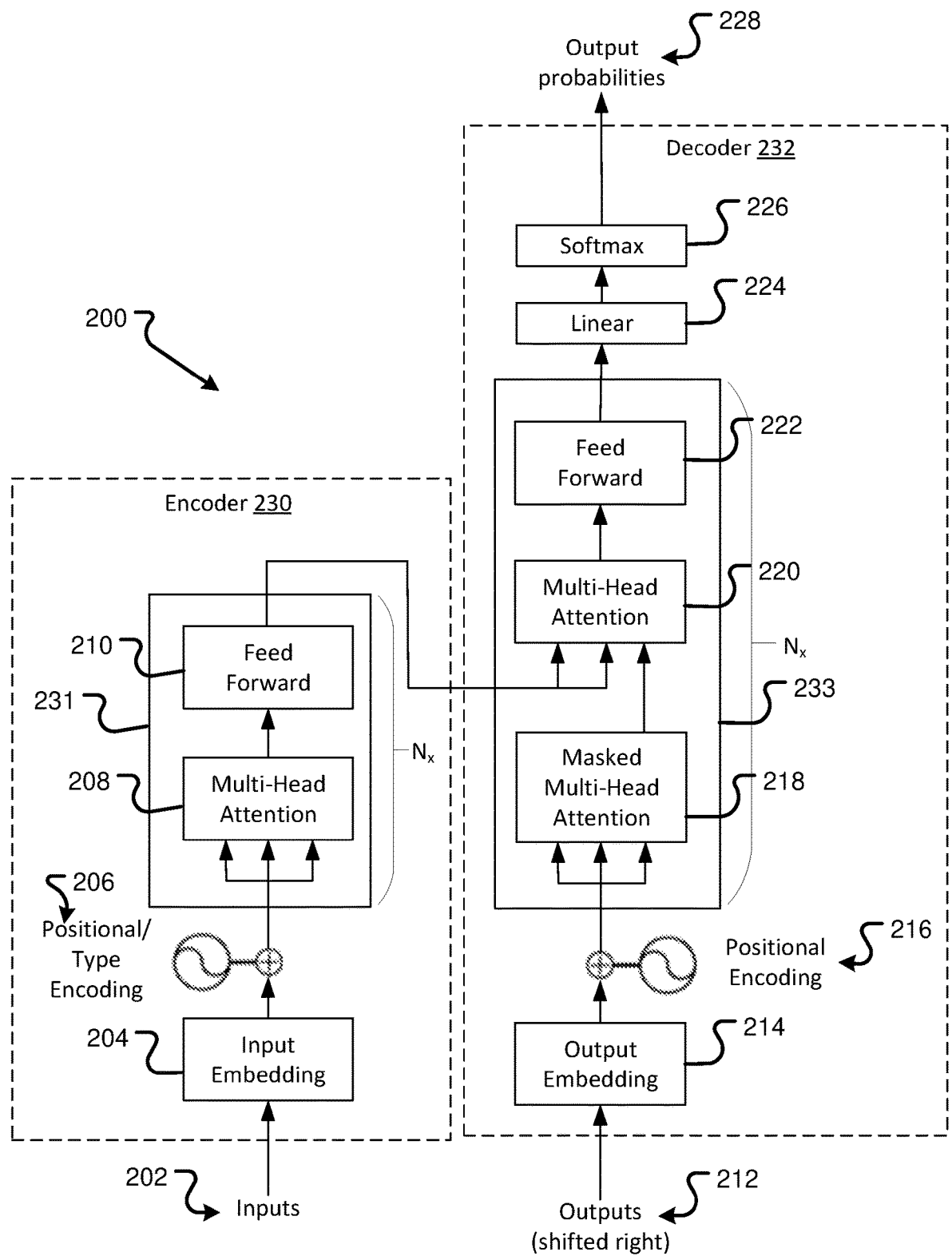
FIG. 2 depicts a Transformer in accordance with examples of the present disclosure.

FIG. 2 shows a Transformer 200 in accordance with aspects of the present disclosure. Transformers are described in detail in Reference 2. The Transformer 200 includes an encoder 230 and a decoder 232. Both the encoder 230 and the decoder 232 are composed of any number of modules (e.g., module 231 in encoder 230 and module 233 in decoder 232), which is described by $N_x$ in FIG. 2. The inputs 202 (e.g., text strings) and outputs 212 (e.g., target sequences) are first embedded 204, 214 into an n-dimensional space (e.g., vector). Next the embedded inputs are positionally encoded by positional encoder 206. Because the Transformer 200 does not have any recurrent networks that can remember how sequences are fed into a model and a sequence depends on the order of its elements, every part of the input sequence should have a relative position. These positions are added to the embedded representation (n-dimensional vector) of each part of the input by positional encoder 206.

The encoder 230 and decoder 232 contain multi-head attention layers 208 and 220, respectively, and feed forward layers 210 and 222, respectively. The multi-head attention layers 208, 220 include several scaled dot-product attention layers running in parallel. Each scaled dot-product attention layer is optionally described by the following equation:

$$\text{Attention}(Q,K,V) = \text{softmax}\left(\frac{QK^T}{\sqrt{d_k}}\right)V \qquad \text{Equation 1}$$

In Equation 1, Q is a matrix that contains the query (e.g., vector representation of one word in the sequence), K are all the keys (e.g., vector representations of all the words in the sequence) and V are the values, which are the vector representations of all the parts in the sequence. For the encoder and decoder multi-head attention modules (e.g., modules 208 and 218), V has the same word sequence as Q. However, for the attention module that is taking into account the encoder and the decoder sequences (e.g., module 220), V is different from the sequence represented by Q because the sequence is different when it is taking into account the output of both the encoder and decoder as opposed to the inputs of each.

Thus, the values in V are multiplied and summed with some attention-weights a, where the attention weights are defined by:

$$a = \text{softmax}\left(\frac{QK^T}{\sqrt{d_k}}\right) \qquad \text{Equation 2}$$

In Equation 2, the weights a may be defined by how each part of the sequence (represented by Q) is influenced by all the other parts in the sequence (represented by K). Additionally, the SoftMax function is applied to the weights a to have a distribution between 0 and 1. Those weights are then applied to all the parts in the sequence that are introduced in V.

The attention mechanism is preferably repeated multiple times with linear projections of Q, K and V. Repeating the attention mechanism provides different levels of abstraction. When attending at first or single level, the correlation may be weak. But at a higher or additional level, the correlation becomes more clear. This allows the system to learn from different representations of Q, K and V, which is beneficial to the model. These linear representations are done by multiplying Q, K and V by weight matrices W that are learned during the training.

Those matrices Q, K and V are different for each position of the attention modules in the structure depending on whether they are in the encoder, decoder, or in-between the encoder and decoder so that attention is applied on either the whole encoder input sequence or a part of the encoder input sequence. The multi-head attention module 220 that connects the encoder 230 and decoder 232 ensures that the encoder input-sequence is taken into account together with the decoder input-sequence up to a given position.

After the multi-attention head layers 208, 220 in both the encoder and decoder, there are pointwise feed-forward layers 210, 222, which may have identical parameters for each position, and which can be described as a separate, identical linear transformation of each element from the given sequence.

Decoder translation is done word by word. For training, the decoder input sequence 212 is shifted to the right one position (e.g., one word) to mask the decoder input sequence. One reason is that it is not desirable for the model to learn how to copy the decoder input sequence during training, but the model should learn to predict the next word/character given the encoder sequence and a particular decoder sequence, which has already been seen by the model at multi-head attention layer 220. If the decoder sequence 212 isn't shifted, the model learns to simply 'copy' the decoder input 212, since the target word/character for position i would be the word/character i in the decoder input. Thus, by shifting the decoder input by one position, the model needs to predict the target word/character for position i having only seen the word/characters 1, . . . , i–1 in the decoder sequence. This prevents the model from simply learning the copy/paste task. The first position of the decoder input is filled with a start-of-sequence token because that place would otherwise be empty due to the right-shift. Similarly, an end-of-sentence token is appended to the decoder input sequence to mark the end of that sequence and it is also appended to the target output sentence.

In addition to the right-shifting, the Transformer applies a mask to the input in the first multi-head attention module 208 to avoid seeing potential 'future' sequence elements. This is specific to the Transformer architecture because there are no RNNs to input the sequence sequentially. Here, everything is input together and if there were no mask, the multi-head attention would consider the whole decoder input sequence at each position. The target sequence used for loss calculations is simply the decoder input without shifting it and with an end-of-sequence token at the end.

Figure 3:
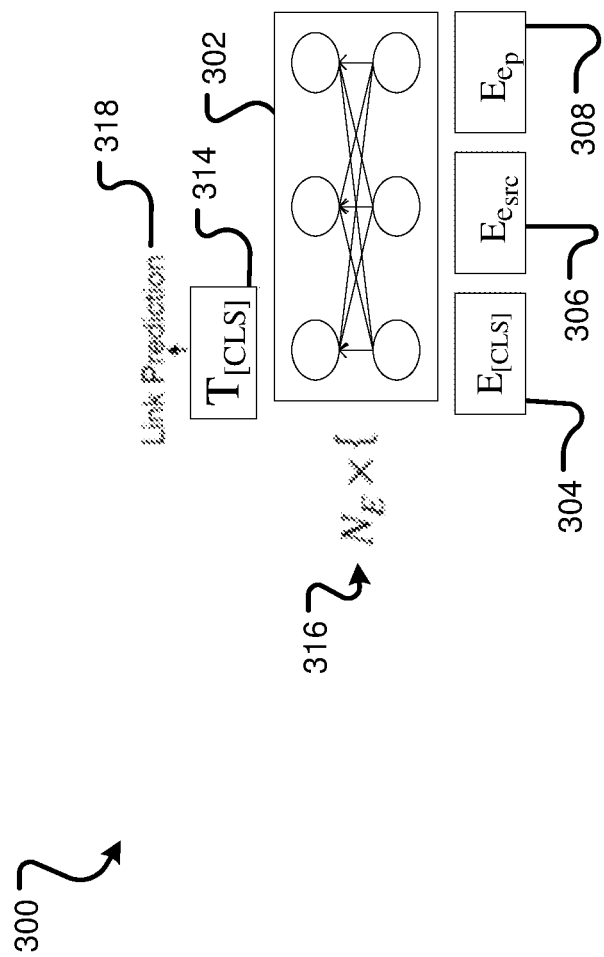
FIG. 3 depicts a Transformer model in accordance with examples of the present disclosure.

FIG. 3 illustrates a context-independent transformer model 300 that may be used to predict a link (e.g., a target node) in a knowledge graph, such as knowledge graph 100.

The model 300 may be used to fill in a missing target node in a knowledge graph or to respond to a query for content or as part of a content recommendation system. As discussed above with reference to FIG. 1, a knowledge graph can be viewed as set of triplets (G={($e_s$, $r_p$, $e_o$)}) and each has three items: the subject ($e_s$ is a set of ε ($e_s \in ε$)), the predicate ($r_p$ is a set of $\Re$ ($r_p \in \Re$), and the object ($e_o$ is a set of ε ($e_o \in ε$)) to describe a single fact (link) in knowledge graph. The Transformer model 300 approximates a pointwise scoring function $\psi : ε \times \Re \times ε \rightarrow \mathbb{R}$, which takes a triplet as input and produces as output a score reflecting the plausibility of correctness of the fact represented by the triplet. In the task of link prediction, given a triplet with either the subject or the object missing, the goal is to find the correct entity from the set of all entities ε. Where an incomplete triplet ($e_s$; $r_p$) is given, the transformer model 300 can predict the object $e_o$. And vice versa, the subject $e_s$ can be predicted in a similar process, except that the reciprocal predicate will be used to distinguish these two cases. The entity in the incomplete triplet is referred to as the source entity $e_{src}$ 306 and the entity that is predicted (which is also missing from the incomplete triplet) is referred to as the target entity $e_{tgt}$. Link prediction can be done in a straightforward manner with a Transformer encoder as the scoring function. For example, given an incomplete triplet (Mona Lisa (e.g., 126), painted by (e.g., 124), $e_o$), multiple objects can be predicted where each object has a score. The scores are ranked and the higher the score, the more likely the predicted target object (e.g., 102) is accurate.

The context-independent Transformer model 300 includes one or more transformer encoders 302 (such as transformer encoder 230 in FIG. 2). Although only one Transformer encoder 302 is shown, any number of Transformer encoders 302 may be included as shown by the $N_E$ 316. It is preferable to use a multiple (e.g., multilayer) Transformer encoders 302 to receive more accurate link prediction. Multiple encoders provide more interaction information to improve accuracy of the link prediction. Inputs to the Transformer encoder 302 are randomly initialized embeddings of the source entity $e_{src}$ 306, the predicate $r_p$ 308, and a special [CLS] token 304 which serves as an additional bias term. The three different learned type embeddings are directly added to the three token embeddings similar to the input representations of BERT except that there is no position input embedding (e.g., 206) and the type embeddings are being used instead to differentiate if the embedding is for the CLS token, $e_{src}$ or $r_p$. Additional details on BERT are described in Reference 3. The output embedding corresponding to the [CLS] token ($T_{[CLS]}$) 314 can be considered an aggregation of the output embeddings for $e_{src}$ and $r_p$ (not shown) and may be used to predict the link prediction 318 (e.g., target entity), which is implemented as follows. First the plausibility score of the true triplet is computed as a dot-product between $T_{[CLS]}$ and the token embedding of the target entity. In the same way, the plausibility scores for all other candidate entities are computed and normalized using the softmax function. Lastly, the normalized distribution is used to get the cross-entropy loss $L_{LP} = -\log p(e_{tgt}|T_{[CLS]})$ for training. The loss function will reflect the chance that the correct answer is predicted incorrectly. Back-propagating the loss to the neural network will iteratively update the parameter matrices to converge to the optimal solution. Thus, during the training, the plausibility of correctness score of the ground-truth entity should have the highest score, otherwise a penalty would be back-propagated to neural network to learn.

The Transformer model 300 may be used as a context-independent baseline. However, learning knowledge graph embeddings 318 from one triplet at a time ignores the abundant structural information in the graph context. The Hierarchical Transformer model, as described in FIGS. 4-5, also considers the relational neighborhood (e.g., neighborhood 128 in FIG. 1) of the source vertex (entity, e.g., Da Vinci node 102 in FIG. 1), which may include all of its adjacent vertices in the graph, denoted as $N_G(e_{src}) = \{(e_{src}; r_i; e_i)\}$. In some aspects of the present disclosure, the referred neighborhood considers only edges connecting to the source vertex.

Figure 4:
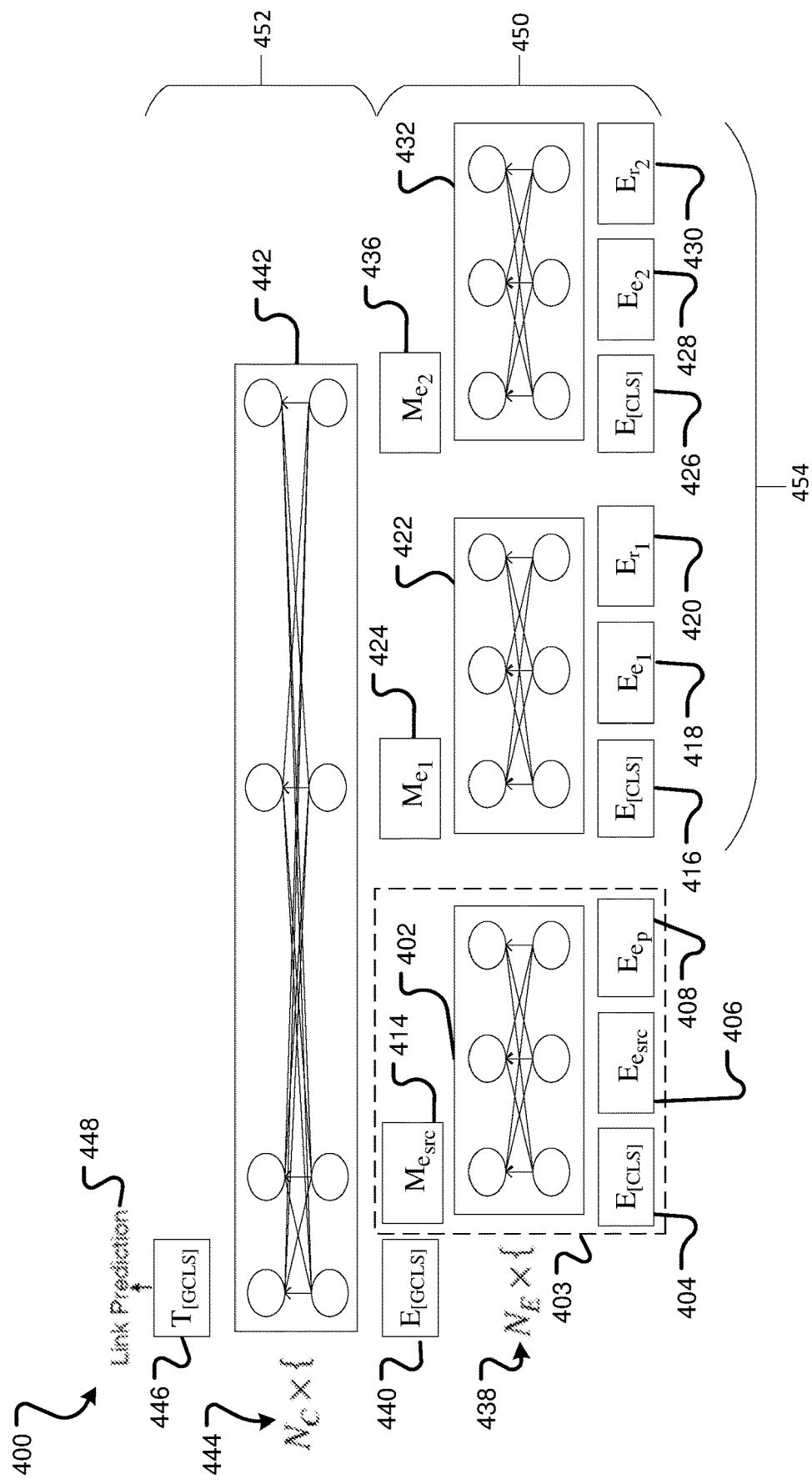
FIG. 4 depicts a hierarchical Transformer model in accordance with examples of the present disclosure.

FIG. 4 illustrates a Hierarchical Transformer model 400 for learning knowledge graph embeddings (e.g., a target node) of a source triplet 403 in accordance with aspects of the present disclosure. The model 400 may be used to fill in a missing target node in a knowledge graph or to respond to a query for content or as part of a content recommendation system. The Hierarchical Transformer model 400 includes two blocks 450, 452 of multi-layer bidirectional Transformer encoders 402, 422, 432, 442.

The block 450, sometimes referred to as the Entity Transformer, is configured to learn interactions between an entity and its associated relation type. Different from the previously described context independent scenario in FIG. 3, this entity Transformer 450 is now generalized to also encode information from a relational context. In aspects of the present disclosure, there are two cases in the context-dependent scenario. First, the source entity embedding 406 is considered with the predicate embedding 408 along with token embedding 404 as inputs to Transformer 402 to create output comprising an intermediate embedding $M_{e_{src}}$. Second, one or more entity embeddings 418, 428 from the graph neighborhood of the source entity embedding 406 are considered with the relation type embeddings 420, 430 of the edge that connects them. For example, a first neighborhood entity embedding ($E_{e1}$) 418 along with a first neighborhood relationship embedding ($E_{r1}$) 420 and a token embedding 416 are input into Transformer 422 to create as output an intermediate embedding ($M_{e1}$) 424. A second neighborhood entity embedding ($E_{e2}$) 428 along with a second neighborhood relationship embedding ($E_{r2}$) 430 and a token embedding 426 are input into Transformer 432 to create as output an intermediate embedding ($M_{e2}$) 436. Although only two neighborhood entity/relation pairs are shown, any number of neighborhood entity/relation pairs may be used. The block 450 is configured to include all useful features from the entity-relation composition into vector representations or intermediate embeddings 414, 424, 436 to be further used by the Transformer block 452.

The Transformer block 452 is sometimes referred to as the context Transformer. Given the output vector representations/intermediate embeddings 414, 424, 436 of the entity Transformer block 450 and a special [GCLS] embedding 440, the Transformer block 452 contextualizes the source entity embedding 406 with relational information from its graph neighborhood 454. The special [GCLS] embedding 440 is the output embedding for the entire hierarchical transformer model and is used to dot-product with the candidate embedding.

Similarly, three type embeddings are assigned to the special [GCLS] token embedding 440, the intermediate source entity embedding 414, and the other intermediate neighbor entity embeddings 424 and 432. The cross-entropy loss for link prediction is now changed as follows:

$$\mathcal{L}_{LP} = -\log p(e_{tgt}|T_{[GCLS]}) \quad \text{Equation 3}$$

The Transformer block 452 aggregates contextual information together with the information from the source entity embedding 406 and the predicate embedding 408 by using structural features extracted from the output vector representations/intermediate embeddings 414, 424, 436 of the Transformer block 450. The intermediate embeddings 414, 424, 436 are input into Transformer 442 in the block 452 to create Target embedding 446 $T_{[GCLS]}$ which can be used for link prediction 448. Although one layer of Transformer encoders is shown in block 450 and one Transformer encoder 442 is shown in block 452, any number of Transformer encoders may be used as shown by $N_E$ 438 and $N_C$ 444. As discussed above with reference to FIG. 3, it is preferable to use a multiple (e.g., multilayer) Transformer encoders to receive more accurate link prediction. Multiple encoders provide more interaction information to improve accuracy of the link prediction 448.

Figure 5:
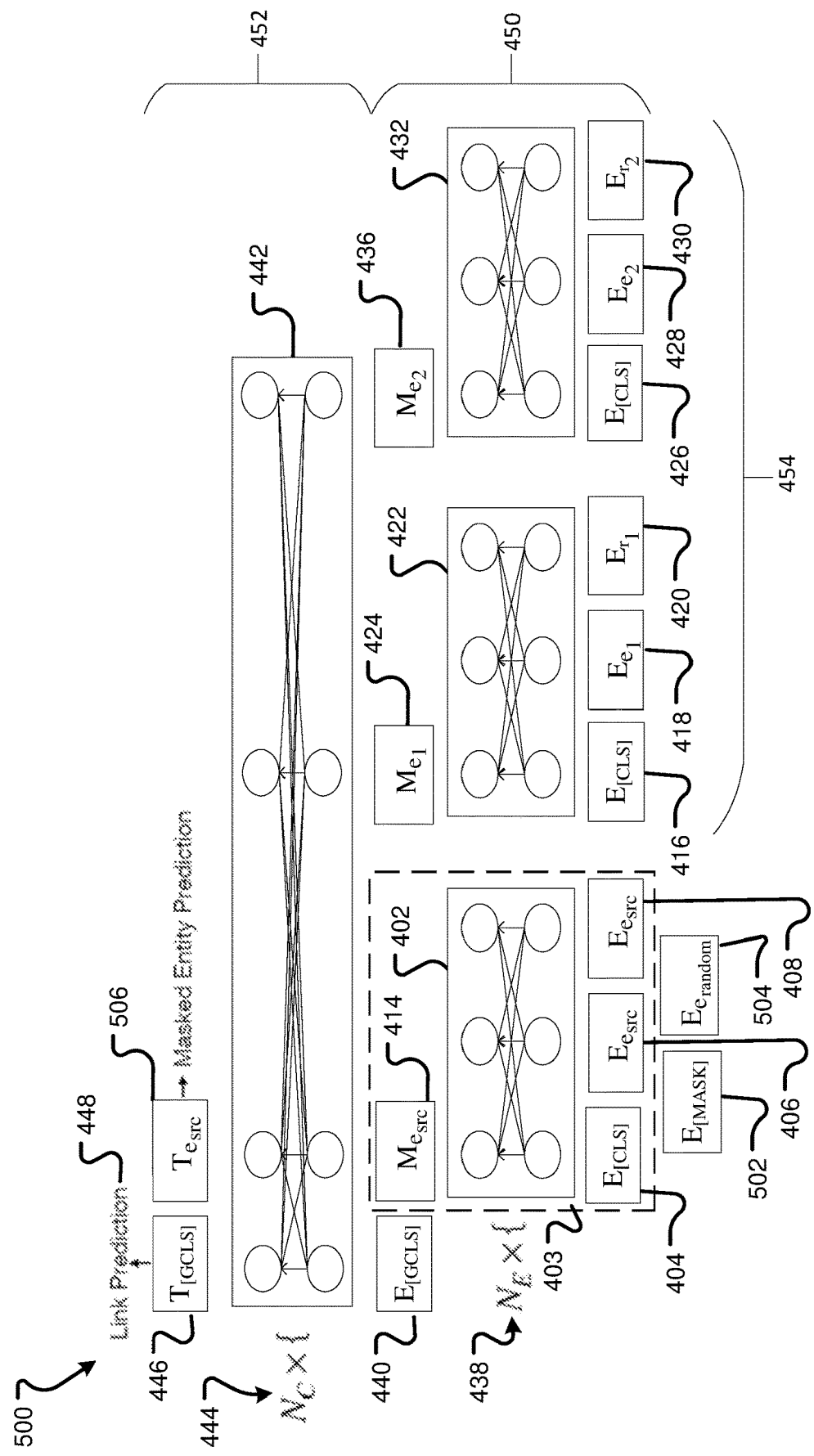
FIG. 5 depicts a hierarchical Transformer model in accordance with alternative examples of the present disclosure.

FIG. 5 depicts illustrates a Hierarchical Transformer model 500 for learning knowledge graph embeddings of a source triplet 403 in accordance with aspects of the present disclosure. The Hierarchical Transformer model 500 is similar to Hierarchical Transformer model 400, expect as described below.

Indiscreetly supplying contextual information to the model during training might cause problems. On the one hand, since a source entity often contains particular information for link prediction, the model may learn to ignore the additional contextual information, which could also be noisy. On the other hand, the introduction of rich contextual information could in turn downgrade information from the source entity and cause potential over-fitting problems. To solve these problems, a Masked Entity Prediction (MEP) task is used to balance the process of contextualization during training.

To avoid the first problem, in aspects of the present disclosure a masking strategy is applied to the source entity embedding 406 of each training example as follows. During training, a proportion of training examples are randomly selected in a batch. With certain probabilities, the input source entity is replaced with a special mask token [MASK] 502, a random chosen entity 504, or left unchanged. The purpose of these perturbations is to introduce extra noise to the information from the source entity embedding 406, thus requiring the model 500 to learn contextual representations. The probability of each category (masked, random, and unchanged) is a dataset-specific hyper-parameter: for example, the source entity embedding 406 can be masked out more frequently if its graph neighborhood 454 is denser (in which case, the source entity embedding 406 can be easily replaced by the additional contextual information).

In terms of the second problem, the model's awareness of the masked entity should be promoted. Thus, the model 500 is trained to recover the perturbed source entity embedding 406 based on the additional contextual information. To do this, the output embedding corresponding to the source entity $T_{e_{src}}$ 506 is used to predict the correct source entity via a classification layer (not shown). This is done by minimizing the loss $L_{MEP}$. The same weight matrix in the input embeddings layer is shared with the linear transformation of this classification layer. The cross-entropy classification loss is added to the previously-mentioned link prediction loss as an auxiliary loss, as follows.

$$\mathcal{L}_{MEP} = -\log p(e_{src}|T_{e_{src}})$$

$$\mathcal{L} = \mathcal{L}_{LP} + \mathcal{L}_{MEP} \quad \text{Equation 4}$$

This step is useful when the contextual clues are insufficient to do link prediction solely, meaning the information from the source entity should to be emphasized. This step may be unnecessary when the contextual information is ample. Thus, dataset-specific configurations are used to strike a balance between these two sides. However, the first step of entity masking is usually beneficial to the utilization of contextual information. In addition to the MEP task, a uniform neighborhood sampling strategy is optionally used where only a fraction of the entities in the graph neighborhood will appear in a training example. This sampling strategy acts like a data augmenter and similar to the edge dropout regularization in graph neural network methods.

The ground truth target entity may be removed from the source entity's neighborhood during training. It will otherwise create a dramatic train-test mismatch because the ground truth target entity can always be found from the source entity's neighborhood during training while it can rarely be found during testing. The model will thus learn to naively select an entity from the neighborhood.

Figure 6:
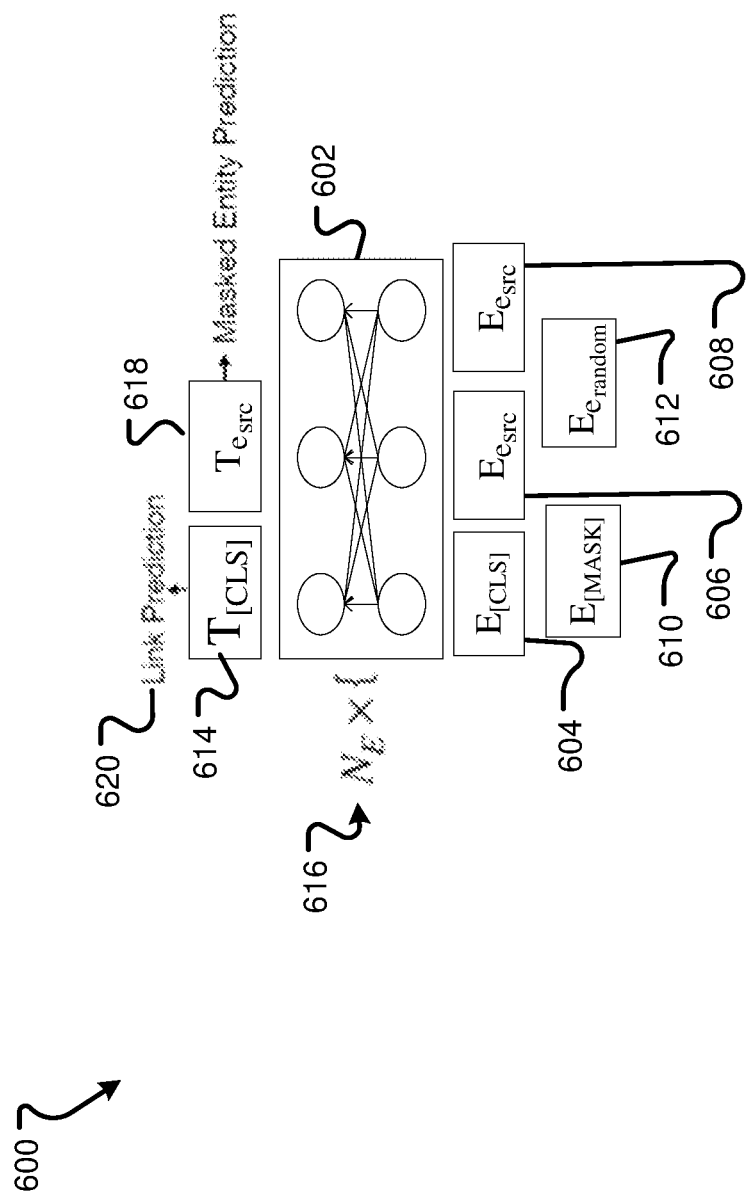
FIG. 6 depicts a Transformer model in accordance with alternative examples of the present disclosure.

FIG. 6 illustrates a context-independent transformer model 600 that may be used to predict a link 620 in a knowledge graph, such as knowledge graph 100. The transformer model 600 is similar to transformer model 300 except that it includes the MEP task described in connection with FIG. 5. The MEP task is used to balance the entity and relation (predicate).

The Transformer model 600 includes one or more transformer encoders 602. Although only one Transformer encoder 602 is shown, any number of Transformer encoders 602 may be included as shown by the $N_E$ 616. Inputs to the Transformer encoder 602 are randomly initialized embeddings of the source entity $e_{src}$ 606, the predicate $r_p$ 608, and a special [CLS] token 604 which serves as an additional bias term. Three different learned type embeddings are directly added to the three token embeddings similar to the input representations of BERT except that there is no position input embedding and the type embeddings are being used to differentiate if the embedding is for the CLS token, $e_{src}$ or $r_p$. During training, a proportion of training examples are randomly selected in a batch. With certain probabilities, the input source entity 606 is replaced with a special mask token [MASK] 610, a random chosen entity 612, or left unchanged. The output embedding corresponding to the [CLS] token can be considered an aggregation of the output embeddings for $e_{src}$ and $r_p$ (not shown) and may be used to predict the target entity, which is implemented as follows. First the plausibility score of the true triplet is computed as a dot-product between $T_{[CLS]}$ and the token embedding of the target entity. In the same way, the plausibility scores for all other candidate entities are computed and normalized using the softmax function. Lastly, the normalized distribution is used to get the cross-entropy loss $L_{LP} = -\log p(e_{tgt}|T_{[CLS]})$ for training.

The model's awareness of the masked entity should be promoted. Thus the model 600 is trained to recover the perturbed source entity embedding 606. To do this, the output embedding corresponding to the source entity $T_{e_{src}}$ 618 is used to predict the correct source entity via a classification layer (not shown). This is done by minimizing the loss $L_{MEP}$. The same weight matrix in the input embeddings layer is shared with the linear transformation of this classification layer. The cross-entropy classification loss is added to the previous mentioned link prediction loss as an auxiliary loss, as follows.

$$L_{LP_{LP}} = -\log p(e_{tgt}|T_{[CLS]})$$ Equation 5

$$L = L_{LP} + L_{MEP}$$ Equation 6

The loss function will reflect the chance that correct answer is predicted incorrectly. Back-propagating the loss to the neural network will iteratively update the parameter matrices to converge to the optimal solution.

Figure 7A:
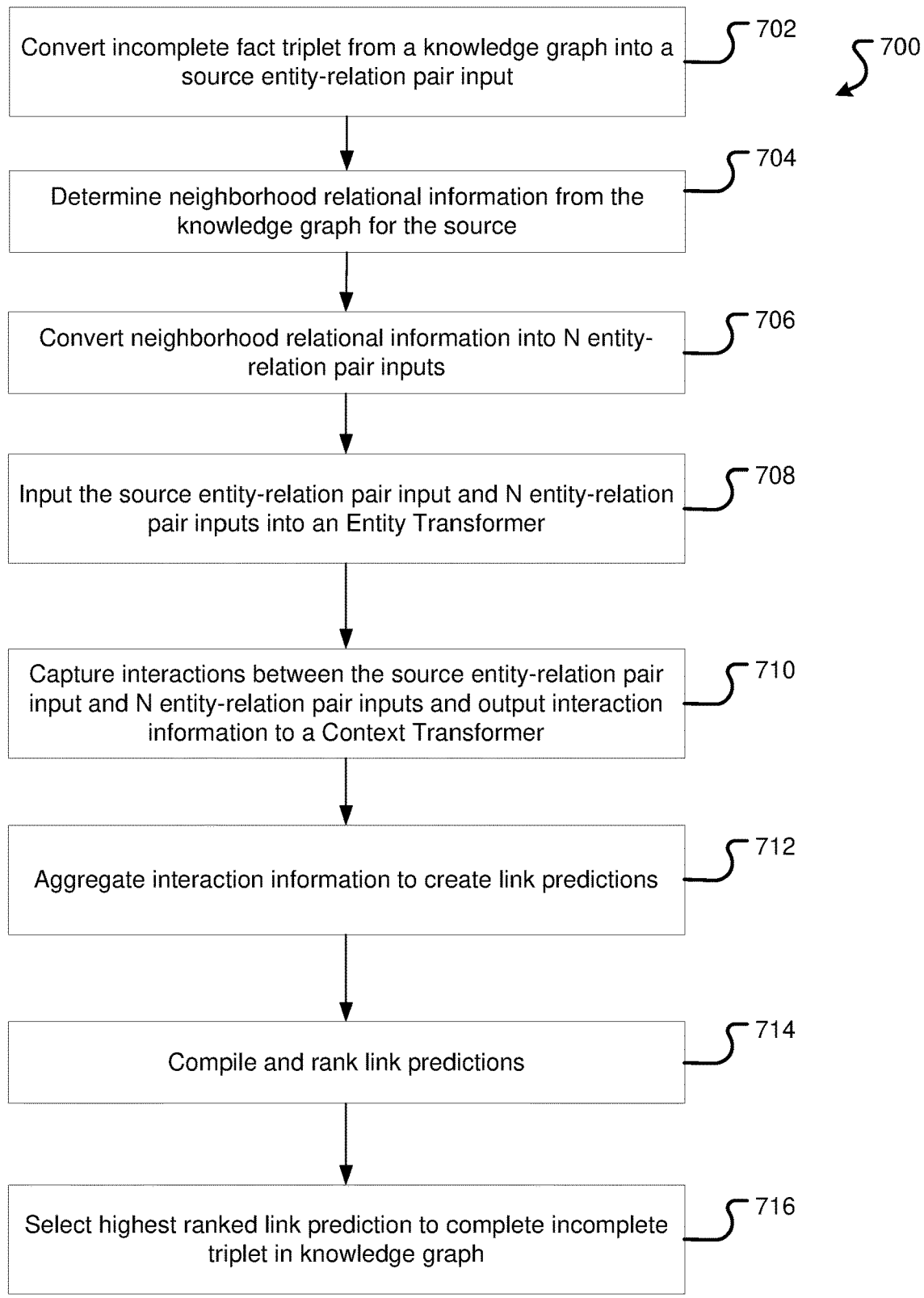
FIG. 7A depicts details of a method for predicting links in a knowledge graph using a Transformer model in accordance with examples of the present disclosure.

FIG. 7A depicts details of a method 700 for predicting links in a knowledge graph using a Transformer model as described in connection with the present disclosure. A general order for the steps of the method 700 is shown in FIG. 7A. Generally, the method 700 starts at 702 and ends at 716. The method 700 may include more or fewer steps or may arrange the order of the steps differently than those shown in FIG. 7A. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6, 7B, and 8-9.

At operation 702, an incomplete fact triplet (e.g., generated from a user query or to complete an incomplete knowledge graph) is converted into a source entity-relation pair input for a source vertex (e.g., node 102) following a process similar to that shown by the conversion of inputs 202 to input embeddings 204 in FIG. 2 except that instead of performing positional encoding (e.g., 206) type encoding is performed. Type encoding encodes each embedding (e.g., 304, 306, 308) as a source node or as a predicate relationship or as a CLS token. As described above in connection with FIGS. 4 and 5, in aspects of the present disclosure the source entity-relation pair input comprises embeddings of a token (e.g., CLS token 404), a source entity (either a subject or an object) (e.g., embedding 406), and a predicate (e.g., embedding 408). At operation 704, the neighborhood relational information (e.g., neighborhood 128) for the source is determined. In aspects of the present disclosure, the neighborhood relational information includes a random sampling of adjacent vertices to the source vertex in the knowledge graph. So for example, the relational neighborhood may be a random sampling of all entity, relation pairs that are connected directly to the source vertex in the knowledge graph. In aspects of the present disclosure, such will comprise a certain number (N) of entity-relation pairs that are connected to the source. For example, for source vertex 102 in FIG. 1, the entity, relation pairs would comprise node 116, edge 114; node 120, edge 122; node 126, edge 124; node 106, edge 104, and node 110, edge 112. At operation 706, the neighborhood relational information is converted into N entity-relation pair inputs comprising embeddings of the related entity (e.g., embeddings 418, 428), its relationship (e.g., embeddings 420, 430), and a token (e.g., CLS tokens 416, 426) as described herein. At operation 708, the source entity-relation pair input (e.g., embeddings 406 and 408) and the entity-relation pair inputs (e.g., embeddings 418 and 420 and 428 and 430) are input into an Entity Transformer, e.g., the block 450 of the Hierarchical Transformer model as shown in FIGS. 4 and 5. In aspects, each of the source entity-relation pair input and the N entity-relation pair inputs are input into a separate transformer encoder (e.g., 406 and 408 are input into transformer encoder 402 and 418 and 420 are input into transformer encoder 422). At operation 710, the Entity Transformer extracts features of contextual information and outputs this information to the Context Transformer, e.g., the block 452 of the Hierarchical Transformer model as shown in FIGS. 4 and 5. In aspects of the present disclosure, the transformer encoders (e.g., 402, 422, 432) take a sequence of input token embeddings as input (e.g., transformer encoder 402 takes embeddings 404, 406, and 408 as input) and output a token embedding (e.g., embedding 414). The input token embeddings are blended by the transformer encoders and therefore the output can be interpreted as a representation of the interactions of the input token embeddings. At operation 712, the Context Transformer aggregates interaction information from the contextual information (e.g., intermediate embeddings 440, 414, 424, 436) it receives from the Entity Transformer. Aggregation itself is a special blending operation. At operation 714, link predictions are made based on the target embedding output from the context Transformer (e.g., embedding 446) for the target entity (e.g., the missing entity from the incomplete triplet) and are ranked by their plausibility for correctness. At operation 716, the highest ranked link prediction is selected as the target entity to complete the triplet and added to the knowledge graph. In the example where the incomplete fact triplet is generated from a user query, the selected complete triplet is presented to the user as responsive to the query.

Figure 7B:
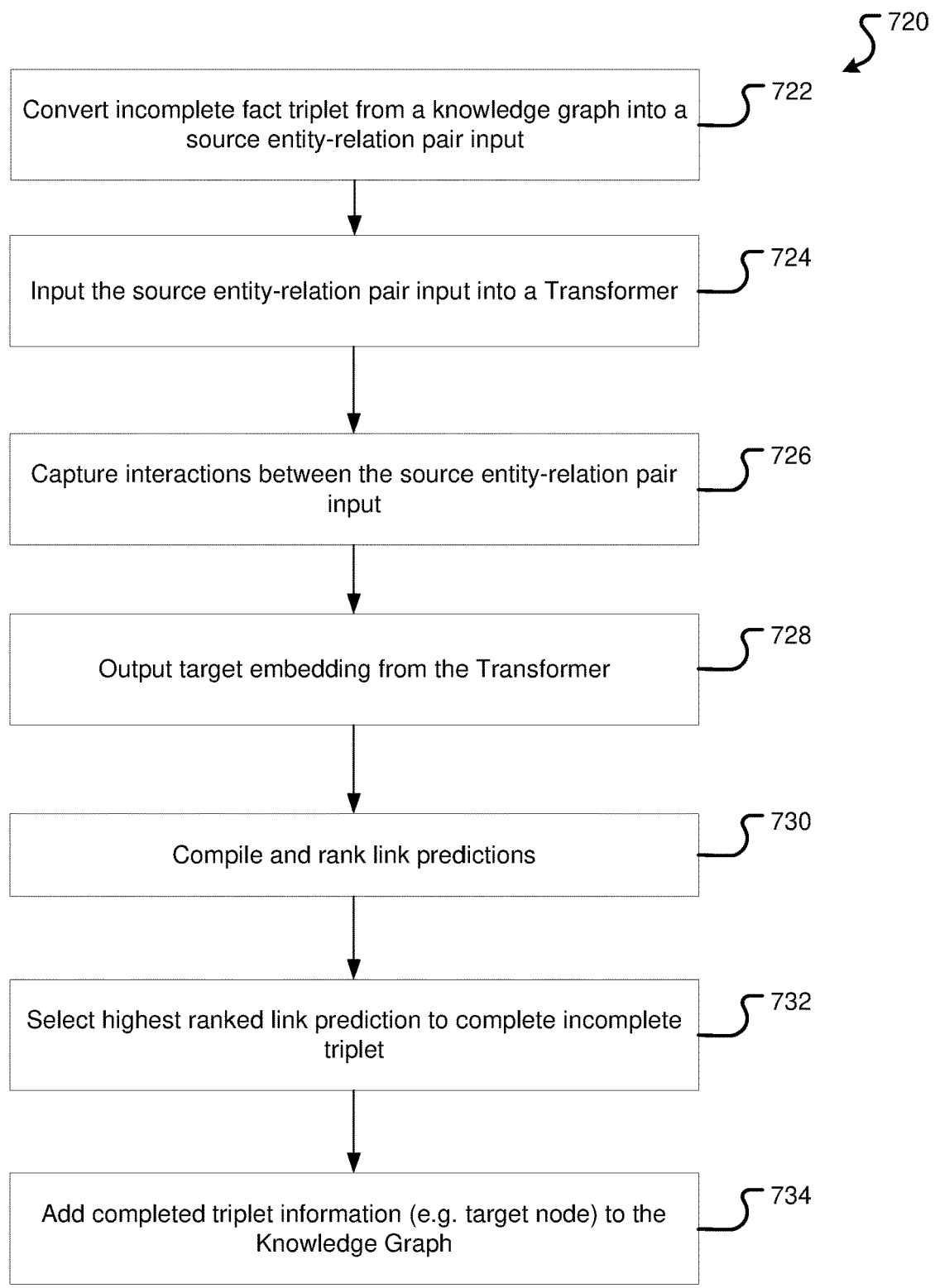
FIG. 7B depicts details of a method for predicting links in a knowledge graph using a Transformer model in accordance with alternative examples of the present disclosure.

FIG. 7B depicts details of a method 720 for completing an incomplete fact triplet in a knowledge graph using a Transformer model as described in connection with the present disclosure. A general order for the steps of the method 720 is shown in FIG. 7B. Generally, the method 720 starts at 722 and ends at 734. The method 720 may include more or fewer steps or may arrange the order of the steps differently than those shown in FIG. 7. The method 720 can be executed as a set of computer-executable instructions executed by a computer system and encoded or stored on a computer readable medium. Further, the method 720 can be performed by gates or circuits associated with a processor, Application Specific Integrated Circuit (ASIC), a field programmable gate array (FPGA), a system on chip (SOC), or other hardware device. Hereinafter, the method 720 shall be explained with reference to the systems, components, modules, software, data structures, user interfaces, etc. described in conjunction with FIGS. 1-6, 7A, and 8-9.

At operation 722, an incomplete fact triplet from a knowledge graph is converted into a source entity-relation pair input for a source vertex (e.g., node 102 from FIG. 1) following a process similar to that shown by the conversion of inputs 202 to input embeddings 204 in FIG. 2 followed by type encoding (as opposed to positional encoding 206). As described above in connection with FIGS. 3 and 6, in aspects of the present disclosure the source entity-relation pair input comprises embeddings of a token (e.g., CLS token 304, 604), a source entity (either a subject or an object) (e.g., embedding 306, 606), and a predicate (e.g., embedding 308, 608). At operation 724, the source entity-relation pair input (e.g., embeddings 304, 306, 308) are input into a Transformer (e.g., Transformer encoder 302). At operation 726, the Transformer captures interaction information between the source entity-relation pair input. At operation 728, the Transformer outputs a target embedding (e.g., embedding 314). At operation 730, link predictions are made based on the target embedding output for the target entity (e.g., the missing entity from the incomplete triplet) and are ranked by their plausibility for correctness. At operation 732, the highest ranked link prediction is selected to complete the triplet. In the example where the incomplete fact triplet is generated to fill missing information from a knowledge graph, the selected complete triplet is added to the knowledge graph.

Figure 8:
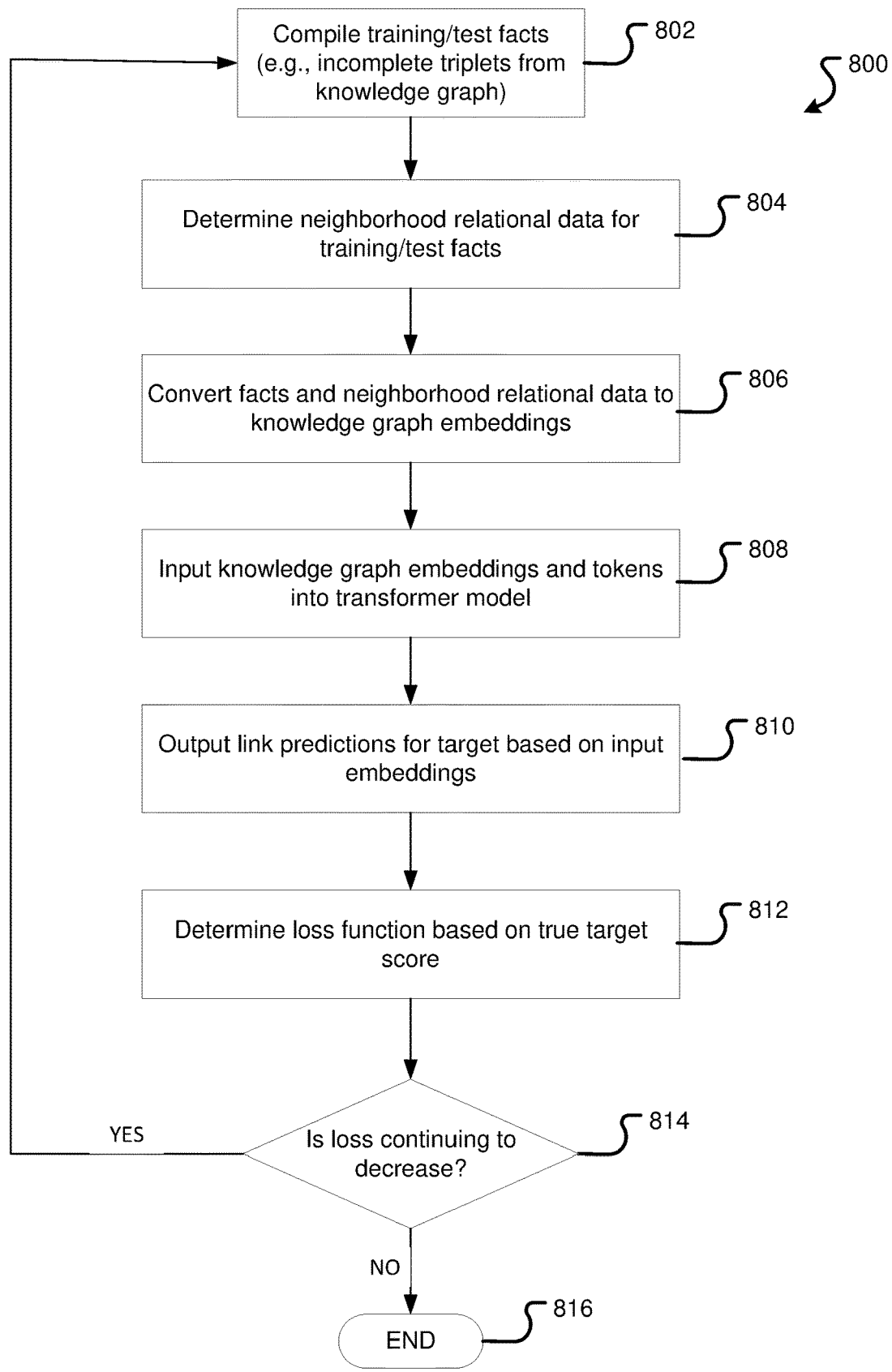
FIG. 8 depicts details of a method for training a Transformer model to predict links in a knowledge graph in accordance with examples of the present disclosure.

FIG. 8 depict details of a method 800 for training a Transformer model to predict links in a knowledge graph in accordance with aspects of the present disclosure. A general order for the steps of the method 800 is shown in FIG. 8. Generally, the method 800 starts at 802 and ends at 816. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, data structures, user interfaces, etc. described in conjunction with FIGS. 1-7 and 9.

At operation 802, training data and/or test data are compiled. Training data and testing data are mutually exclusive. Training data is used to train the model while testing data is for testing the model performance on a hold-out (unseen) dataset. In aspects of the present disclosure, the training/test data is compiled from public knowledge graphs including general knowledge graphs, such as Freebase, Wikidata, DPPedia, Nell, and Satori, and/or vertical knowledge graphs such as Microsoft Academic, Microsoft Office, and Bing. The training/test data comprises incomplete triplets with a missing subject or a missing object as described herein. The missing subject or object is referred to as the target. At step 804, neighbors and relations (e.g., neighborhood relational data comprising entity/relation pairs) of the existing source (either the subject if the object is missing or the object if the subject is missing) are determined. In aspects of the present disclosure, a random sampling of the neighborhood relational data is determined for each training fact and/or test fact. At operation 806, the incomplete facts and optionally the neighborhood relational data (if present) are converted to knowledge graph embeddings (e.g., embeddings 306 and 308 from FIG. 3, embeddings 406, 408, 418, 420, 428, 430 from FIGS. 4-5, and embeddings 606 and 608 from FIG. 6) that are ready to be fed into the Transformer encoders as described with reference with FIGS. 3-7. The knowledge graph embeddings and tokens (e.g., CLS tokens 304 from FIGS. 3, 404, 416, and 426 from FIGS. 4-5, and 604 from FIG. 6) are input into transformer encoders (e.g., encoders 302 from FIGS. 3, 450 and 452 from FIGS. 4-5, and 602 from FIG. 6) at operation 808. As described with reference to FIGS. 3-6, link predictions for the target (either the missing subject or missing object) are made based on the output of the transformer model (e.g., embedding 314 from FIG. 3, embedding 446 from FIGS. 4-5, and embedding 614 from FIG. 6) at operation 810. At operation 812, the loss function is determined by comparing the link prediction to true target score and as described herein. Training continues until the loss function stops decreasing ("YES" at decision 814). Once the loss function stops decreasing ("NO" at decision 814) the method 800 ends at 816.

Figure 9:
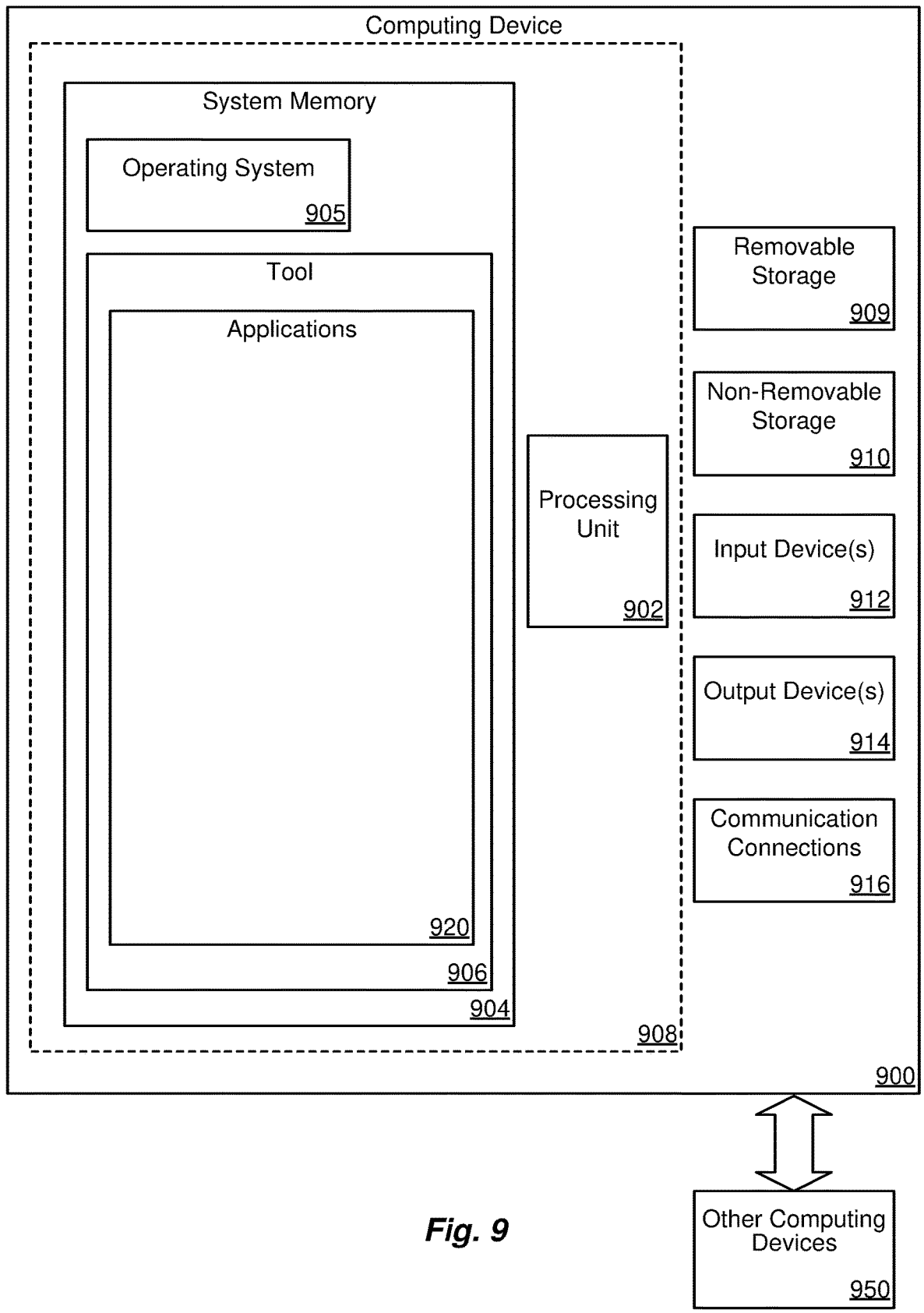
FIG. 9 depicts block diagram illustrating physical components (e.g., hardware) of a computing device with which aspects of the disclosure may be practiced.

FIG. 9 and the associated description provides a discussion of an operating environment in which aspects of the disclosure may be practiced. However, the devices and systems illustrated and discussed with respect to FIG. 9 are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. The computing device components described below may be suitable for the computing devices described above. In a basic configuration, the computing device 900 may include at least one processing unit 902 (e.g., a tensor, vector, or graphics processing unit) and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software applications 907, and/or one or more components supported by the systems described herein. The operating system 905, for example, may be suitable for controlling the operation of the computing device 900.

Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the at least one processing unit 902, the program modules 906 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Embodiments of the disclosure may be practiced by a vector processor, a tensor processing unit (TPU), or a graphics processing unit (e.g., GPU), which are configured or optimized for parallel processing operations such as those described herein. Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. An output 914, corresponding to a virtual display may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The present disclosure relates to systems and methods for completing an incomplete triplet in a knowledge graph according to at least the examples provided in the sections below:

(A1) In one aspect, some embodiments include a computer-implemented method of completing an incomplete triplet in a knowledge graph (e.g., 100). The method comprises receiving (e.g., 724), by a transformer (e.g., 230, 302, 602), a source entity-relation pair input (e.g., 306, 308, 606, 608) from the knowledge graph (e.g., 100); capturing (e.g., 726), by the transformer (e.g., 230, 302, 602), interaction information for the source entity-relation pair input (e.g., 306, 308, 606, 608); outputting (e.g., 728), by the transformer (e.g., 230, 302, 602), link predictions (e.g., 318, 620) based on the interaction information; ranking (e.g., 730) the link predictions (e.g., 318, 620) based on a plausibility score; selecting (e.g., 732) the highest ranked link prediction (e.g., 318, 620) to be a target node for the incomplete triplet; and adding (e.g., 734) the target node to the incomplete triplet in the knowledge graph (e.g., 100).

(A2) In some embodiments of A1, the method further comprises converting (e.g., 722) an incomplete fact triplet from the knowledge graph (e.g., 100) to the source entity-relation pair input (e.g., 306, 308, 606, 608), wherein the incomplete fact triplet is missing one of a subject or an object.

(A3) In some embodiments of A1-A2, the source entity-relation pair input (e.g., 306, 308, 606, 608) further comprises a token embedding (e.g., 304), a source embedding (e.g., 306), and a predicate embedding (e.g., 308).

(A4) In some embodiments of A1-A3, outputting link predictions (e.g., 318, 620) further comprises outputting a token (e.g., 314, 614) for each link prediction (e.g., 318, 620), wherein the token (e.g., 314, 614) comprises an aggregation of the source embedding (e.g., 306, 606) and the predicate embedding (e.g., 308, 608) and using the outputted token (e.g., 314, 614) to determine the plausibility score for the link prediction (e.g., 318, 620).

(A5) In some embodiments of A1-A4, the transformer (e.g., 306, 308, 606, 608) comprises multiple transformer blocks (e.g., 316, 616).

(A6) In another aspect, some embodiments include a computer-implemented method of predicting a target entity (e.g., node 102) in a knowledge graph (e.g., 100). The method comprises receiving (e.g., 708), by an entity transformer (e.g., 450), a source entity-relation pair input (e.g., 406, 408) and a neighborhood entity-relation pair input (e.g., 418, 420, 428, 430) from the knowledge graph (e.g., 100); capturing (e.g., 710), by the entity transformer (e.g., 450), interaction information for the source entity-relation pair input (e.g., 406, 408) and interaction information for the neighborhood entity-relation pair input (e.g., 418, 420, 428, 430); aggregating (e.g., 712), by a context transformer (e.g., 452), the interaction information for the source entity-relation pair input (e.g., 406, 408) and the interaction information for the neighborhood entity-relation pair input (e.g., 418, 420, 428, 430); outputting (e.g., 714), by the context transformer (e.g., 452), target entity predictions (e.g., 448) based on the aggregated interaction information; ranking (e.g., 714) the target entity predictions (e.g., 448) based on a plausibility score; selecting (e.g., 716) the highest ranked target entity prediction (e.g., 448) to be the target entity; and adding (e.g., 734) the target entity to the knowledge graph (e.g., 100).

(A7) In some embodiments of A6, the method further comprises converting (e.g., 702) an incomplete fact triplet from the knowledge graph (e.g., 100) to the source entity-relation pair input (e.g., 406, 408), wherein the incomplete fact triplet is missing one of a subject or an object, and wherein the missing subject or the missing object comprises the target entity (e.g., 448).

(A8) In some embodiments of A6-A7, the source entity-relation pair input (e.g., 406, 408) further comprises a token embedding (e.g., 404), a source embedding (e.g., 416), and a predicate embedding (e.g., 426).

(A9) In some embodiments of A6-A8, the token embedding is a CLS token (e.g., 404).

(A10) In some embodiments of A6-A9, the neighborhood entity-relation pair input (e.g., 418, 420, 428, 430) further comprises a token embedding (e.g., 416, 426), an entity embedding (e.g., 418, 428), and a relationship embedding (e.g., 420, 430).

(A11) In some embodiments of A6-A10, the neighborhood entity-relation pair input (e.g., 418, 420, 428, 430) from the knowledge graph (e.g., 100) further comprises multiple neighborhood entity-relation pair inputs (e.g., 418, 420, 428, 430) from the knowledge graph (e.g., 100).

(A12) In some embodiments of A6-A11, the knowledge graph (e.g., 100) comprises a plurality of nodes (e.g., 102, 106, 110, 116, 126, 130, 132, 134) connected by edges (e.g., 104, 108, 114, 122, 124, 136, 138, 140), wherein each of the plurality of nodes comprises an entity and each of the edges represents a relationship between two of the plurality of entities.

(A13) In some embodiments of A6-A12, the interaction information for the source entity-relation pair input (e.g., 406, 408) comprises a source intermediate embedding (e.g., 414) and the interaction information for the neighborhood entity-relation pair input (e.g., 418, 420, 428, 430) comprises a neighborhood intermediate embedding (e.g., 424, 436) and the method further comprises: inputting into the context transformer (e.g., 452) the source intermediate embedding (e.g., 414), the neighborhood intermediate embedding (e.g., 424, 436), and a special [GLCS] embedding (e.g., 440).

(A14) In another aspect, some embodiments include a hierarchical transformer model (400, 500) for predicting a target entity in a knowledge graph (e.g., 100) that comprises a processor (e.g., 902) and memory (e.g., 904) storing computer-executable instructions, which when executed, cause the hierarchical transformer model (400, 500) to: receive (e.g., 708), by a first level transformer block (e.g., 450), a source entity-relation pair input (e.g., 406, 408) and a neighborhood entity-relation pair input (e.g., 418, 420, 428, 430) from the knowledge graph (e.g., 100); capture (e.g., 710), by the first level transformer block (e.g., 450), interaction information for the source entity-relation pair input (e.g., 406, 408) and interaction information for the neighborhood entity-relation pair input (e.g., 418, 420, 428, 430); aggregate (e.g., 712), by a second level transformer block (e.g., 452), the interaction information for the source entity-relation pair input (e.g., 406, 408) and the interaction information for the neighborhood entity-relation pair input (e.g., 418, 420, 428, 430); output (e.g., 714), by the second level transformer block (e.g., 452), link predictions (e.g., 448) based on the aggregated interaction information; rank (e.g., 714) the link predictions (e.g., 448) based on a plausibility score; select (e.g., 716) the highest ranked link prediction to be the target entity for the knowledge graph (e.g., 100); and add (e.g., 734) the target entity to the knowledge graph (e.g., 100).

(A15) In some embodiments of A14, the interaction information for the source entity-relation pair input (e.g., 406, 408) comprises a source intermediate embedding (e.g., 414) and the interaction information for the neighborhood entity-relation pair input (e.g., 418, 420, 428, 430) comprises a neighborhood intermediate embedding (e.g., 424, 436) and the hierarchical transformer model (400, 500) further comprises computer-executable instructions, which when executed, cause the hierarchical transformer model (400, 500) to input into the second level transformer (e.g., 452) the source intermediate embedding (e.g., 414), the neighborhood intermediate embedding (e.g., 424, 436), and a special [GLCS] embedding (e.g., 440).

(A16) In some embodiments of A14-A15, the special [GLCS] embedding (e.g., 440) comprises an output embedding for the hierarchical transformer model (400, 500).

(A17) In some embodiments of A14-A16, the hierarchical transformer model (400, 500) converts an incomplete fact triplet from the knowledge graph (e.g., 100) to the source entity-relation pair input (e.g., 406, 408), wherein the incomplete fact triplet is missing one of a subject or an object.

(A18) In some embodiments of A14-A17, the source entity-relation pair input (e.g., 406, 408) further comprises a token embedding (e.g., 404), a source embedding (e.g., 406), and a predicate embedding (e.g., 408).

(A19) In some embodiments of A14-A18, the token embedding is a CLS token (e.g., 404).

(A20) In some embodiments of A14-A19, the neighborhood entity-relation pair input (e.g., 418, 420, 428, 430) further comprises a token embedding (e.g., 416, 426), an entity embedding (e.g., 418, 428), and a relationship embedding (e.g., 420, 430).

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The invention claimed is:

1. A computer-implemented method of completing an incomplete triplet in a knowledge graph comprising:
   receiving, by a transformer, a source entity-relation pair input from the knowledge graph;
   capturing, by the transformer, interaction information for the source entity-relation pair input;
   outputting, by the transformer, link predictions based on the interaction information;
   ranking the link predictions based on a plausibility score;
   selecting the highest ranked link prediction to be a target node for the incomplete triplet; and
   adding the target node to the incomplete triplet in the knowledge graph.

2. The computer-implemented method of claim 1 further comprising:
   converting the incomplete triplet from the knowledge graph to the source entity-relation pair input, wherein the incomplete triplet is missing one of a subject or an object.

3. The computer-implemented method of claim 1 wherein the source entity-relation pair input further comprises a token embedding, a source embedding, and a predicate embedding.

4. The computer-implemented method of claim 3 wherein outputting link predictions further comprises:
   outputting a token for each link prediction, wherein the token comprises an aggregation of the source embedding and the predicate embedding; and
   using the outputted token to determine the plausibility score for the link prediction.

5. The computer-implemented method of claim 1 wherein the transformer comprises multiple transformer blocks.

6. A computer-implemented method of predicting a target entity in a knowledge graph comprising:
   receiving, by an entity transformer, a source entity-relation pair input and a neighborhood entity-relation pair input from the knowledge graph;
   capturing, by the entity transformer, interaction information for the source entity-relation pair input and interaction information for the neighborhood entity-relation pair input;
   aggregating, by a context transformer, the interaction information for the source entity-relation pair input and the interaction information for the neighborhood entity-relation pair input;
   outputting, by the context transformer, target entity predictions based on the aggregated interaction information;
   ranking the target entity predictions based on a plausibility score;
   selecting the highest ranked target entity prediction to be the target entity; and
   adding the target entity to the knowledge graph.

7. The computer-implemented method of claim 6 further comprising:
   converting an incomplete triplet from the knowledge graph to the source entity-relation pair input, wherein the incomplete triplet is missing one of a subject or an object, and wherein the missing subject or the missing object comprises the target entity.

8. The computer-implemented method of claim 6 wherein the source entity-relation pair input further comprises a token embedding, a source embedding, and a predicate embedding.

9. The computer-implemented method of claim 8 wherein the token embedding is a classification token.

10. The computer-implemented method of claim 6 wherein the neighborhood entity-relation pair input further comprises a token embedding, an entity embedding, and a relationship embedding.

11. The computer-implemented method of claim 6 wherein the neighborhood entity-relation pair input from the knowledge graph further comprises multiple neighborhood entity-relation pair inputs from the knowledge graph.

12. The computer-implemented method of claim 6 wherein the knowledge graph comprises a plurality of nodes connected by edges, wherein each of the plurality of nodes comprises an entity and each of the edges represents a relationship between two of the plurality of entities.

13. The computer-implemented method of claim 6 wherein the interaction information for the source entity-relation pair input comprises a source intermediate embedding and the interaction information for the neighborhood entity-relation pair input comprises a neighborhood intermediate embedding and the method further comprises:
   inputting into the context transformer the source intermediate embedding, the neighborhood intermediate embedding, and a special embedding.

14. A system for predicting a target entity in a knowledge graph using hierarchical transformers comprising:
   a processor;
   memory storing computer-executable instructions, which when executed, cause the system to:
      receive, by a first level transformer block, a source entity-relation pair input and a neighborhood entity-relation pair input from the knowledge graph;
      capture, by the first level transformer block, interaction information for the source entity-relation pair input and interaction information for the neighborhood entity-relation pair input;
      aggregate, by a second level transformer block, the interaction information for the source entity-relation pair input and the interaction information for the neighborhood entity-relation pair input;
      output, by the second level transformer block, link predictions based on the aggregated interaction information;
      rank the link predictions based on a plausibility score;
      select the highest ranked link prediction to be the target entity for the knowledge graph; and
      add the target entity to the knowledge graph.

15. The system of claim 14 wherein the interaction information for the source entity-relation pair input comprises a source intermediate embedding and the interaction information for the neighborhood entity-relation pair input comprises a neighborhood intermediate embedding and the hierarchical transformer model further comprises computer-executable instructions, which when executed, cause the system to:

input into the second level transformer the source intermediate embedding, the neighborhood intermediate embedding, and a special embedding.

16. The system of claim 15 wherein the special embedding comprises an output embedding for the system.

17. The system of claim 14 further comprising computer-executable instructions, which when executed, cause the system to:

convert an incomplete triplet from the knowledge graph to the source entity-relation pair input, wherein the incomplete triplet is missing one of a subject or an object.

18. The system of claim 14 wherein the source entity-relation pair input further comprises a token embedding, a source embedding, and a predicate embedding.

19. The system of claim 14 wherein the token embedding is a classification token.

20. The system of claim 14 wherein the neighborhood entity-relation pair input further comprises a token embedding, an entity embedding, and a relationship embedding.

* * * * *